United States Patent [19]

Kaplan et al.

[11] 4,306,692

[45] Dec. 22, 1981

[54] ATTITUDE ACQUISITION MANEUVER FOR A BIAS MOMENTUM SPACECRAFT

[75] Inventors: Marshall H. Kaplan, State College, Pa.; Thomas C. Patterson, Campbell, Calif.; Alberto Ramos, Beallsville, Md.

[73] Assignee: Communications Satellite Corporation, Washington, D.C.

[21] Appl. No.: 21,279

[22] Filed: Mar. 16, 1979

[51] Int. Cl.³ .............................................. B64G 1/28
[52] U.S. Cl. ................................................ 244/165
[58] Field of Search ............... 244/164, 165, 169, 170, 244/171, 176

[56] References Cited

U.S. PATENT DOCUMENTS 3,940,096  2/1976  Keigler et al. ...................... 244/165

OTHER PUBLICATIONS

Rusch et al., "Intelsat. V Spacecraft Design", AIAA Paper No. 78-528, (9-1977).
Franklin et al., "A High-Power Com. Tech. Sat. . . .", AIAA Paper #72-580, Apr. 1972.
Kaplan et al., "Attitude Acquisition Maneuver Bias Momentum Sat.", Comsat Tech. Rev., 1976, vol. 6, No. 1, pp. 1-23.
Dougherty et al., "Ana. and Des. of Whecon", AIAA Paper #68-461, Apr. 1968.
Kaplan, "Modern Spacecraft Dynamics & Control", John Wiley & Sons, 1976 pp. VIII, 147, 148, 149, 367, 368, 369.

*Primary Examiner*—Galen L. Barefoot
*Attorney, Agent, or Firm*—Sughrue, Mion, Zinn, Macpeak & Seas

[57] ABSTRACT

An orientation maneuver for a bias momentum stabilized spacecraft is carried out on a spacecraft initially spinning about a minimum moment of inertia axis. With the spacecraft spinning about that axis, it is precessed until the angular momentum vector points to the south along the orbit normal. The spin rate is then reduced until the angular momentum remaining in the spacecraft is substantially equal to the nominal angular momentum of the momentum wheel in an in-orbit operation. The momentum wheel is then energized and gradually spun up until it contains its nominal angular momentum. As the wheel accelerates, the angular momentum will be redistributed between the wheel and the body, with the total system angular momentum remaining constant. When the wheel has reached its final speed, the spacecraft will have re-oriented itself such that the body of the spacecraft is spinning about the positive pitch axis, coning about the angular momentum vector in a nutational motion. Using thrustors on-board the spacecraft, the pitch rate of the body is then reduced to a value sufficiently low to permit earth capture in the earth sensor's field of view. As a result of pitch rate reduction, the total system angular momentum becomes substantially equal to the wheel momentum vector. Nutation is damped by either passive or active damper on the spacecraft.

9 Claims, 1 Drawing Figure

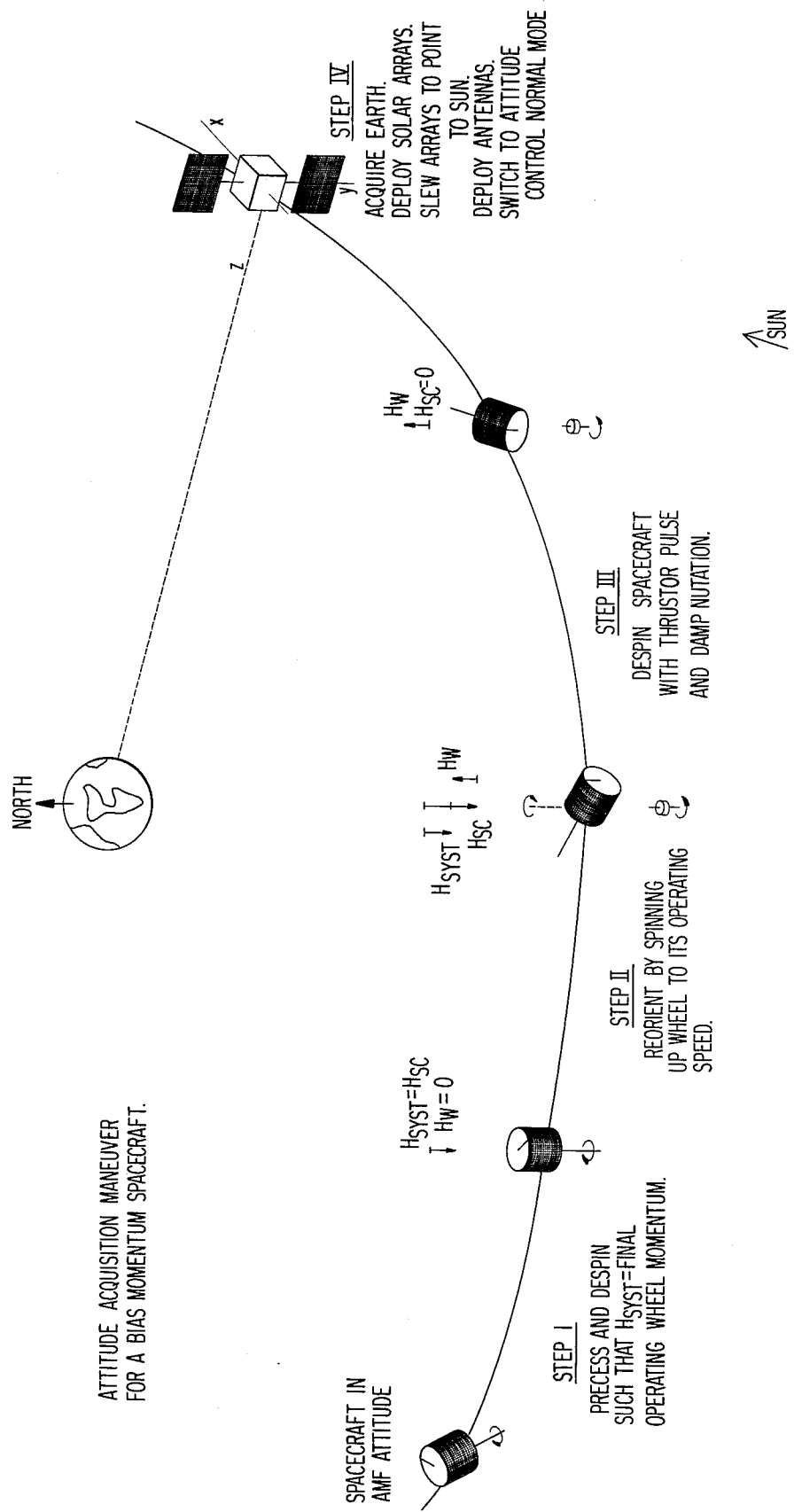

ATTITUDE ACQUISITION MANEUVER FOR A BIAS MOMENTUM SPACECRAFT

BACKGROUND OF THE INVENTION

1. Field Of The Invention

This invention relates to a three-axis control angular momentum stabilized spacecraft, and to the re-orientation of such a spacecraft from the transfer orbit attitude to the on-station attitude.

2. Prior Art

Unmanned spacecraft are typically launched from the earth by means of three distinct types of launch vehicles. A first type, utilizing an unmanned launch rocket, utilizes a technique of direct injection whereby the launch vehicle propels the spacecraft directly into its final on-station orbit. In the case of a geosynchronous orbit located approximately 22,300 miles above the earth, direct injection techniques require substantially large launch vehicles, even for moderate size spacecraft.

The ability to place a spacecraft into a geostationary orbit is important because when on-station at that point, the spacecraft appears to remain fixed relative to a point on the surface of the earth. Hence, geostationary orbits are important for communications spacecraft and weather spacecraft which can be accurately positioned relative to ground-based antennas or provide continuous coverage of the same portion of the earth for scientific studies.

Direct injection capability has not been used because of the increased cost of launch vehicles and mission uncertainties. Hence, an alternative technique of placing the spacecraft into an initial orbit has been utilized with the spacecraft then undergoing a transfer orbit coupled with an appropriate firing of the spacecraft apogee motor to boost it into a synchronous orbit. The use of the transfer orbit launch sequence allows the use of smaller launch vehicles, such as the Atlas-Centaur or, in the 1980 time frame, the space shuttle.

In the transfer orbit, various attitude maneuvers are carried out to position the spacecraft for apogee motor firing used to boost it into a synchronous orbit as well as maintaining telemetry capabilities with the earth.

The transfer orbit maneuvers can be categorized in two basic groups, depending on the type of stabilization which the spacecraft will ultimately use in a synchronous orbit. If the spacecraft is to be spin stabilized in its on-orbit orientation, then precession maneuvers to position the spacecraft for apogee motor firing are conventionally carried out by first spinning up the spacecraft in the transfer orbit and allowing that spin rate to be maintained throughout the precession maneuvers; once complete, the spacecraft can be precessed to an earth coverage attitude.

The prior art is replete with techniques for carrying out such precession maneuvers on spin-stabilized spacecraft as typified by U.S. Pat. No. 3,294,344, to Rosen, et al., and U.S. Pat. No. 3,758,051, to Williams. Those two patents disclose a series of precession and velocity control maneuvers. The spin axis of the spacecraft is precessed to achieve a new attitude distinct from the initial attitude for re-orientation during the transfer orbit.

A second class of spacecraft are those which are controlled about the three principal axes while in an in-orbit mode. Hence, the spacecraft of this class are not in a spinning configuration while on-station but use concepts of stored bias momentum generally along the pitch axis together with thrustor firings to maintain a three-axis stabilized orientation.

Conventionally, in the prior art, such spacecraft are launched into a transfer orbit by a booster, such as an Atlas-Centaur or the space shuttle in combination with a spin-stabilized upper stage, after being spun up to achieve spin stabilization in the transfer orbit. The spacecraft remains spin stabilized in the transfer orbit with precession maneuvers carried out to re-orientate the spacecraft prior to apogee motor firing. After final orbit is achieved, solar arrays and communications antennas are deployed. The prior art is replete with various techniques for effectuating transfer orbit maneuvers of such bias momentum spacecraft. The actual use of spacecraft, such as the Communications Technology Satellite (CTS), presents a well-documented example of a bias momentum, three-axis stabilized spacecraft which has undergone precession maneuvers. This spacecraft has been reported in the literature, for example, in AIAA Paper No. 72-5800, "A High-Powered Communications Technology Satellite for 12/14 GHz Band," by Franklin and Davidson.

In such spacecraft, the technique of re-orientation is accomplished on the spacecraft, which is initially spinning about its axis of maximum moment of inertia in a spin-stabilized mode. When the precession maneuver is to take place, the spacecraft is despun to remove all angular momentum about the initial spin axis. Sun acquisition is accomplished in two steps: The spacecraft is first controlled with thrustors to capture the roll axis to the sun, and then a 90° rotation is performed to align the yaw axis with the sun. The momentum wheel is then spun up while the yaw axis is kept pointing to the sun with thrustors. This technique requires a coordinated precession maneuver utilizing a programmed search maneuver to effect the desired orientation. Hence, the system requires an array of sensors, gyros and thrustors, all coordinated to maintain the spacecraft in a proper orientation during the despin portion, the search portion and when angular momentum is slowly imparted back into the system.

A second technique which has been proposed is to completely despin the spacecraft by means of thrustors with the momentum wheel remaining in a de-energized state. Under the control of various sensors, such as earth horizon sensors and sun sensors, the spacecraft is torqued by thrustors such that the roll axis is pointed toward the sun. In this orientation, the momentum wheel is then spun up, and when the sun, spacecraft and earth are in a co-linear orientation, the spacecraft is slowly rotated about the pitch axis until the yaw axis points toward the earth. The spacecraft is then processed until the pitch axis is normal to the orbit plane. This technique, while eliminating the coordinated momentum maneuver of the CTS system, requires hardware which will not be required for any other phase of the mission. For example, this technique requires that sophisticated rate gyros be utilized during the orientation maneuvers together with additional sensors for the orientation maneuver. This is a severe weight penalty for a one-time sequence of operations.

A third technique has been proposed in U.S. Pat. No. 3,940,096, to Keigler, et al. This technique, like the prior concepts, is applicable to a bias momentum stabilized spacecraft. The technique is used to convert a spin-stable configuration about the maximum moment of inertia axis to three-axis stabilization by a 90° reorientation such that the direction of the thrust vector axis of the apogee motor and that of the axis of the momentum wheel will be interchanged while despinning the spacecraft. As in all of the concepts for three-axis spacecraft, the starting point is a spacecraft in a spin-stabilized configuration which is to be precessed into an orientation for final stabilization and deployment of solar arrays, antennas and the like. The re-orientation maneuver as set forth in the '096 patent consists of the steps of having the spacecraft first spin stabilized about its axis of maximum moment of inertia so that the spin axis is in alignment with the angular momentum vector of the vehicle. This is shown schematically in that patent as spin axis 18 for angular momentum vector H. The spacecraft is then despun to a second spin rate such that at the second spin rate, the angular momentum of the vehicle is substantially equal to the angular momentum stored by the momentum wheel when in an in-orbit condition. During both of these two steps, the momentum wheel is de-energized and the angular momentum vector of the spacecraft is generally pointing, as shown in FIG. 1, along the orbit normal.

the third step in the '096 process is to spin up the momentum wheel at a rate to provide for a reduction in the angular momentum of the body as the axis of the momentum wheel becomes parallel to the total system angular momentum vector, which remains fixed in space. Residual damping of the spacecraft results in only a small pitch rate existing as the final momentum in the body following the maneuver.

The disadvantage of this system is that it is not applicable to a spacecraft whih is not spinning about its axis of maximum moment of inertia. Contemporary spacecraft configurations having large deployable antenna farms and solar arrays will spin about an axis of minimum inertia because of constraints in packaging imposed by the launch vehicle configuration. Essentially, the vehicle shroud which covers the spacecraft during the launch sequence has a maximum size for aerodynamic and vehicle moment of inertia limitations. Once launched and the shroud is ejected, the spacecraft will spin about a principal axis during the transfer orbit to provide gyroscopic stabilization and ensure sufficient solar power for telemetry and command. However, the transition problem remains because initially the spacecraft will be spinning about an axis which is perpendicular to the momentum wheel axis.

SUMMARY OF THE INVENTION

Accordingly, it is an object of this invention to provide a method for accomplishing an attitude acquisition maneuver for a bias momentum spacecraft which is spinning about an axis of minimum moment of inertia.

It is another object of this invention to define a method of re-orientation during the attitude acquisition maneuver wherein the angular momentum of the spacecraft system remains constant.

Yet another object of this invention is to define a technique for controlling the attitude of a momentum bias spacecraft using no equipment other than that which is required for the on-station mode of operation.

These and other objects of this invention are accomplished in a method of re-orienting a spacecraft which is spinning about an axis of the minimum moment of inertia. That minimum moment of inertia is assumed, for this example, to be the yaw axis of the spacecraft. The method of this invention is generally applicable after the apogee motor has been fired and the spacecraft is still in that apogee motor firing attitude, with the momentum wheel de-energized.

The method comprises four essential steps. In the first step, with the spacecraft spinning about the positive yaw axis, it is precessed until the angular momentum vector points south along the orbit normal. The spin rate is then reduced until the angular momentum remaining in the system is substantially equal to the nominal angular momentum which the momentum wheel will possess while spun up in an in-orbit mode of stabilization.

In the second step, the momentum wheel is energized and gradually spins up until it collects the quantity of angular momentum which it will possess while in operation. As the wheel accelerates, angular momentum is redistributed between the wheel and the body and among the axes of the spacecraft. The total system angular momentum, however, remains constant. By the time the wheel has reaches its final operating speed, the spacecraft has re-oriented itself such that the body of the spacecraft is spinning about the positive pitch axis which is coning about the angular momentum vector in a nutational motion. Since the angular momentum vector is still pointing south, the positive pitch axis is also pointing in that general direction. The angular momentum of the wheel is directed along the negative pitch axis so it is pointing approximately north.

In the third step, the thrustors are used such that the pitch rate of the body is reduced to a value sufficiently low to permit earth capture, or acquisition, in the earth sensor's field of view. As a result of pitch rate reduction, the total system angular momentum becomes substantially equal to the wheel momentum in both magnitude and inertial direction. Nutation may be damped by active or passive means on the spacecraft.

Finally, in the fourth step, earth acquisition occurs and solar array deployment can be facilitated together with deployment of various large antenna reflectors.

Several alternatives are present in this method. For example, the spacecraft may be partially despun before the precession maneuver is performed to conserve propellant. Also, active techniques of nutation damping can be employed at the end of the second step to reduce the nutational cone angle before the third step of thrustor use is executed.

These aspects of the invention will be described in greater detail with respect to the FIGURE and the Description of the Preferred Embodiment which follow.

BRIEF DESCRIPTION OF THE DRAWING

The FIGURE shows on a step-by-step basis the method steps used in the practice of this invention.

DESCRIPTION OF THE PREFERRED EMBODIMENT

Referring now to the FIGURE, a spacecraft is shown in highly schematic form. It is to be understood that this invention is directed to spacecraft which, when placed in a transfer orbit, are designed to spin about a minimum moment of inertia axis. Spacecraft of that type will assume this configuration because launch constraints dictate severe packing and weight distribution requirements. For example, the INTELSAT V has been detailed in publications such as AVIATION WEEK and SPACE TECHNOLOGY or reported in more detail in the Spacecraft System Summary, September 1977, generated by Ford Aerospace and Communications Corporation for INTELSAT, and also in AIAA Paper No. 78-528, R. J. Rusch et al., "INTELSAT V Spacecraft Design Summary." Such spacecraft per se form no part of this invention. Rather, by reference, such spacecraft designs are referred to herein to illustrate the type of spacecraft which, when spun up, will tend to spin about a minimum moment of inertia axis.

A spacecraft such as the INTELSAT V is a bias momentum stabilized spacecraft during the in-orbit mode. This technique provides active stabilization for the spacecraft with pitch control maintained by momentum bias of a momentum wheel. Such a momentum wheel normally rotates in the range of approximately 3500 revolutions/minute and provides approximately 35 N·m·s of stored momentum. Roll and yaw control is provided by the wheel's gyroscopic stiffness and by occasionally firing small hydrazine thrustors. The spacecraft, by combination of pitch bias wheel and roll/yaw thrustors, may be three-axis stabilized to a local vertical.

This type of three-axis control is achieved in step 4, as shown in the FIGURE, in which the x axis is parallel to the spacecraft velocity water, regardless of spacecraft orientation, the y axis is normal to the satellite orbit plane, and the z axis is radial to the orbit plane—that is, directed toward the center of the earth. The momentum wheel in such a system is mounted to the spacecraft so that its angular momentum vector lies along the negative body fixed y axis, the pitch axis. The technique of pitch bias, stored momentum, three-axis control is described in the literature as the WHECON (WHEel CONtrol) system, AIAA Paper No. 68-461, H. J. Dougherty et al., "Analysis and Design of WHECON—An Attitude Control Concept."

The achievement of a three-axis stabilized control mode of operation in step 4 is the final product of the acquisition maneuver for the spacecraft. At that point, the spacecraft solar arrays are deployed together with communications antennas and the like. A three-axis stabilized mode of control is necessary because, if the spacecraft were spinning, the spacecraft solar arrays, antennas and the like would deform and snap as a result of the forces created by rotation. Hence, once deployed, the spacecraft is body stabilized in a three-axis control mode.

This invention proceeds from the point of recognition that although such a momentum bias spacecraft can be controlled in a deployed condition utilizing active attitude control techniques, when the spacecraft is folded in a launch configuration, it will not spin about its major moment of inertia axis. Rather, when the antenna reflectors, solar arrays and the like are folded to fit within the launch vehicle shroud, the moments of inertia of the folded body are such that when the body is spun about the apogee motor axis, it will spin about the axis of minimum moment of inertia. Hence, after apogee motor firing, special techniques are necessary to achieve re-orientation of that spacecraft for purposes of achieving an orientation for deployment as set forth in step 4.

As indicated herein, such spacecraft are conventionally launched by a booster, or the space shuttle, into a transfer orbit. When the launch phase is complete, the spacecraft is released from the booster and spun up generally using a spin table or small thrustors. The spacecraft as indicated will tend to spin about the minimum moment of inertia axis which, for purposes of analysis, can be assumed to be the yaw axis. The apogee motor is still attached, and the spacecraft will rotate to provide the necessary gyroscpic stiffness in the transfer orbit to ensure solar power for telemetry and command and to minimize thermal gradients.

Solar power is achieved by having the spacecraft solar cells folded about the outer periphery of the package, and during rotation of the spacecraft in a spin-stabilized mode, those solar cells will be exposed to the sun during portions of the rotation. Thermal gradients are minimized by having the spacecraft rotate so that exposure to the sun of specific portions is minimized. Also, in a spin-stabilized mode, an inherent gyroscopic stability ensues.

During the transfer orbit, firing of the apogee motor occurs to alter the orbit of the spacecraft such that the spacecraft is inserted into a synchronous orbit. In the left-hand representation of the FIGURE, the spacecraft is shown in the AMF (apogee motor firing) attitude, spinning about the minimum moment of inertia axis with the momentum wheel on-board de-energized.

At this point, the first step of the novel method of this invention is practiced. With the spacecraft spinning as shown about its positive yaw axis, the spacecraft is precessed until the angular momentum vector is directed south along the orbit normal. Hence, a first phase in step 1 is a precession maneuver redirecting the spacecraft yaw axis until it points directly south. A second phase is a reduction in the spin rate of the spacecraft until the angular momentum $H_{sc}$ remaining is substantially equal to the nominal angular momentum which the momentum wheel will possess in orbit. Because the momentum wheel itself is still de-energized, the angular momentum of the wheel per se, $H_w$, equals zero. Hence, as shown in the vector diagram, the total angular momentum of the system $H_{syst}$ equals $H_{sc}$. Precession occurs utilizing on-board thrustors in a manner known and well established in the prior art.

In the second step of operation shown in the FIGURE, the spacecraft momentum wheel is energized and gradually spins up until it collects the quantity of angular momentum that it will normally possess in orbit. As the wheel accelerates, angular momentum is redistributed between the wheel and the body and among the axes of the body. Although redistribution takes place, the total system angular momentum remains constant. As spin up proceeds, the spacecraft will re-orient itself such that the body of the spacecraft is then spinning about the positive pitch axis. Additionally, during this mode of spin about the positive pitch axis, the body will cone about the angular momentum vector in a nutational motion. As shown in the FIGURE the angular momentum vector of the spacecraft is pointing south, and disregarding coning, the positive pitch axis will also be pointing in the same general direction. As shown, the angular momentum of the wheel, $H_w$, will be directed along the negative pitch axis so that it is pointing approximately north.

These first two steps should be contrasted to the prior art steps which are delineated in U.S. Pat. No. 3,940,096. The distinction is important because in that prior art, while some similarities may seem apparent, the technique described therein is not applicable to a spacecraft which is spinning initially about the minimum moment of inertia axis. For example, in that prior art, with the spacecraft momentum wheel de-energized, the angular momentum vector is pointing north along the orbit normal, as shown in FIG. 1 of that prior art patent. The spacecraft is spinning about its maximum moment of inertia axis, $I_s$, as shown in FIG. 2 of that patent. Hence, the starting points for the precession maneuver are materially different based on the spin orientation of the spacecraft. A point of similarity is that the despin maneuver common to both first steps does not completely despin the spacecraft but places it within a range of stability of the momentum wheel. However, in the prior art system, when the momentum wheel is spun up, the angular momentum of the spacecraft is reduced, with the difference being absorbed by the momentum wheel. Hence, the prior art reduces the angular momentum of the body, wherein in the present invention, the total system angular momentum remains constant while the body momentum increases.

In the third step of this invention, on-board thrustors are used to reduce the pitch rate of the body to a value sufficiently low to permit earth capture in the earth sensor's field of view. Again, although not shown, earth sensors are commonly employed and are well established within the art. The same earth sensors are used in a geosynchronous orbit to provide the necessary inputs for the spacecraft's attitude determination and control electronics. Such components may be of the infrared earth sensor type used to sense the earth's horizon, or other types of spacecraft attitude control sensors. Because the hardware used is conventional and forms no part of this invention, it need not be discussed in detail. In the third step, the thrustors despin the spacecraft and provide active nutation damping as required. Nutation damping can also be achieved by passive means, such as tubes containing a viscous fluid, sloshing of the fuel tanks and the like. As shown in the FIGURE, the total system angular momentum becomes substantially equal to the wheel momentum both in magnitude and direction. In the fourth step, earth acquisition has occurred with the spacecraft pitch rate reduced; the solar arrays may be deployed together with communications reflectors and the like. The solar arrays may then be slewed to point toward the sun, and with the communications antennas deployed, active attitude control in the normal mode may commence.

Several modifications of this method can be practiced without departing from the essential aspect of this invention. For example, in the first step, the spacecraft could be partially despun before the precession maneuver occurs to conserve on-board propellant. Alternatively, active nutation damping could be employed at the end of the second step to reduce the nutational edge of the spacecraft—that is, coning about the angular momentum vector before the third step of despinning is executed. Again, it should be noted that the concept of active nutation control is well documented in the literature, and, in particular, with respect to contemporary spacecraft designs, such as INTELSAT V. Irrespective of these alternatives, the essential aspect of this invention is that the spacecraft is spinning initially about its minimum inertia axis and re-orientation is accomplished by spinning up the momentum wheel to a nominal speed and in its nominal sense relative to the body of the spacecraft.

Having described our invention,
We claim:

1. A method of orienting the attitude of a spacecraft employing stored bias momentum wheel stabilization for on-station attitude control, said spacecraft placed in an orbit spin stabilized by spinning about an initial axis of rotation being the spacecraft axis of minimum inertia comprising the steps of:
   precessing the spacecraft until the spacecraft angular momentum vector points in a direction which is normal to the orbital plane and opposite to the desired final direction of the momentum wheel, and reducing the spin rate of the spacecraft until the remaining system angular momentum is substantially equal to the stored bias angular momentum of said momentum wheel when in an on-station mode of operation;
   spinning said momentum wheel to the point when stored momentum us substantially equal to on-station operation, whereby during spin of said momentum wheel, total system angular momentum remains constant and said spacecraft re-orients to spin about an axis orthogonal to the initial spacecraft spin axis;
   reducing the spinning of said spacecraft to a spin rate wherein the total system angular momentum vector is substantially equal to the angular momentum vector of said wheel;
   and
   acquiring the earth, and finally commencing stored bias momentum wheel stabilization for said spacecraft.

2. The method of claim 1 further comprising the step of damping nutation in the spacecraft prior to earth acquisition.

3. The method of claim 1 further comprising the step of partially despinning said spacecraft prior to the step of precession.

4. The method of claim 1 further comprising the step of damping nutation of said spacecraft prior to reduction of spin rate for purposes of aligning angular momentum vectors.

5. The method of claim 1 wherein the initial spin about the minimum moment of inertia axis is about the yaw axis of the spacecraft.

6. The method of claim 5 wherein the axis orthogonal to the initial axis is the pitch axis of said spacecraft, and the step of reducing spin rate reduces the pitch rate.

7. The method of claim 6 further comprising the step of damping nutation in the spacecraft prior to earth acquisition.

8. The method of claim 6 further comprising the step of partially despinning said spacecraft prior to the step of precession.

9. The method of claim 6 further comprising the step of damping nutation of said spacecraft prior to reduction of spin rate for purposes of aligning angular momentum vectors.

* * * * *

UNITED STATES PATENT AND TRADEMARK OFFICE
CERTIFICATE OF CORRECTION

PATENT NO. : 4,306,692
DATED : December 22, 1981
INVENTOR(S) : MARSHALL H. KAPLAN ET AL It is certified that error appears in the above—identified patent and that said Letters Patent is hereby corrected as shown below:

Col. 2, line 21, change "72-5800" to -- 72-5880 --;

line 53, change "pro-" to -- pre- --;

Col. 3, line 23, change "the" to -- The --;

line 32, correct spelling of "which";

Col. 5, line 23, change "water" to -- vector --;

Col. 6, line 1, correct spelling of "gyroscopic";

Col. 7, line 47, change "edge" to -- angle --;

Signed and Sealed this

Eleventh Day of May 1982

[SEAL]

Attest:

GERALD J. MOSSINGHOFF

Attesting Officer          Commissioner of Patents and Trademarks